United States Patent [19]

Hasegawa et al.

[11] Patent Number: 4,965,870
[45] Date of Patent: Oct. 23, 1990

[54] IMAGE FORMING APPARATUS WITH USE OF A LASER BEAM

[75] Inventors: Hirofumi Hasegawa; Naoto Ohmori; Yukio Yamada; Narutaka Yoshida, all of Osaka, Japan

[73] Assignee: Minolta Camera Kabushiki Kaisha, Osaka, Japan

[21] Appl. No.: 374,002

[22] Filed: Jun. 29, 1989

[30] Foreign Application Priority Data

Jun. 29, 1988 [JP] Japan .................. 63-162212

[51] Int. Cl.$^5$ ............................................. G03B 27/54
[52] U.S. Cl. ..................... 355/68; 355/229; 355/244; 355/40
[58] Field of Search ............ 355/40, 68, 67, 228, 355/229, 244, 298; 358/296, 300; 346/107 R, 109, 153.1, 160

[56] References Cited

U.S. PATENT DOCUMENTS

| | | | |
|---|---|---|---|
| 3,966,319 | 6/1976 | Lang | 355/51 |
| 4,012,585 | 3/1977 | Chen | 358/285 |
| 4,358,793 | 11/1982 | Hosaka et al. | 358/300 X |
| 4,397,537 | 8/1983 | Tamura | 355/229 X |

FOREIGN PATENT DOCUMENTS

| | | |
|---|---|---|
| 54-25736 | 2/1979 | Japan . |
| 54-130137 | 10/1979 | Japan . |
| 56-23953 | 3/1981 | Japan . |
| 51874 | 3/1985 | Japan ............... 355/244 |
| 61-19033 | 5/1986 | Japan . |

Primary Examiner—L. T. Hix
Assistant Examiner—D. Rutledge
Attorney, Agent, or Firm—Price, Gess & Ubell

[57] ABSTRACT

An image forming apparatus comprising a laser beam radiating unit utilized as a light source, and an optical system that the surface of an original reflects a laser beam radiated from the radiating unit to project a image reflected from the original onto a photosensitive member. In this apparatus, an image is formed selectively in a print mode that an image results from turning on and off the laser beam, in a copy mode that a copy of an original results from exposure of the photosensitive member to the laser beam reflected from the surface of an original or in a composite mode that a composite image is formed of a copy of an original and an image resulting from turning on and off the laser beam. Further, this apparatus comprises a transporting unit for transporting a sheet on which a latent image formed on the photosensitive member is transferred onto the original glass, so that a sheet once discharged from the main body can be reused as an original.

7 Claims, 3 Drawing Sheets

IMAGE FORMING APPARATUS WITH USE OF A LASER BEAM

BACKGROUND OF THE INVENTION

1. Field of the Invention

The present invention relates to an image forming apparatus, and more specifically, an image forming apparatus wherein a photosensitive member charged with a specified potential beforehand is exposed to a laser beam responding to image data so that an electrostatic latent image is formed on the photosensitive member, and then the latent image becomes visible on a sheet of paper.

2. Description of Related Art

Generally, regarding an image forming apparatus wherein an electrostatic latent image on a photosensitive member is caused by exposure to light with image data, and then the latent image appears on a paper sheet, an electrophotographic copier wherein a copy of an original results from reflection and a laser printer wherein a laser beam is turned on and off in accordance with image data are known. These apparatuses are different from each other only in measure of exposure, and the other elements of an image forming section except a light source can be commonly used in the apparatuses.

Therefore, Japanese Laid Open Patent Publication No. 54-25736 suggests an image forming apparatus for which exposure means utilizing the reflection of an original and exposure means utilizing a modulated laser beam are both provided, wherein the other image forming elements are commonly used. This arrangement enables an image to be formed selectively by the reflected light from an original or the modulated laser beam.

In this apparatus, however, it is impossible to form a composite image by using both the reflected light from an original and the laser beam simultaneously. For, in this apparatus, the light to be reflected by the surface of an original and the laser beam are emitted from different light sources, and their optical paths are different except for the last portion of them.

Further, when a paper sheet on which an image has been formed is to be reused as an original, in a conventional apparatus, the sheet should be manually set where an original is exposed. Especially, if it is to be used in an apparatus wherein a composite image can be formed, there will be many opportunities to combine an image formed on a paper sheet with another image. As such usage of the apparatus becomes common, the manual setting of sheets is getting troublesome to operators.

SUMMARY OF THE INVENTION

It is, therefore, an object of the present invention to provide an image forming apparatus wherein not only the reproduction of an original and the image forming with use of a modulated laser beam can be separately and simultaneously performed but also an image which appeared on a paper sheet can be automatically combined with another image.

To attain the above-mentioned object, an image forming apparatus according to the present invention is an apparatus wherein an electrostatic latent image is formed on a photosensitive member charged with a specified potential, the photosensitive member being exposed to light from a light source, and the latent image is developed and then transferred onto a sheet of paper. The image forming apparatus comprises a laser beam radiating means; optical means for guiding the laser beam radiated from the laser beam radiating means to an original glass and for projecting an image reflected from an original onto the photosensitive member; means for transporting a paper sheet, onto which a latent image formed on the photosensitive member has been transferred, onto an original glass.

Accordingly, when the laser beam radiating means is kept on so that the surface of the original keeps on reflecting the laser beam, the image of the original is projected onto the photosensitive member, thereby reproducing the image of the original. Also, when the laser radiating means is turned on and off to radiate the laser beam in accordance with image data with the reflecting surface white, an image is formed only in response to turning on and off the laser beam. Further, when an original is set on the original glass, and at the same time the laser beam radiating means is turned on and off in accordance with image data, a composite image is formed of a copy of the original and an image resulting from turning on and off the laser beam. After a latent image on the photosensitive member appears on a paper sheet, the sheet is transported onto the original glass through the transporting means if necessary. Then, the sheet transported onto the original glass in this way can get another image thereon by being exposed to the laser beam. Thus, it is possible to make a composite image of an image formed on a paper sheet and an image formed by a modulated laser beam.

In an apparatus according to the present invention, needless to say, the reproduction of an original and the image forming with use of a modulated laser beam can be separately performed and simultaneously performed to make a composite image of them. Further, an image which appeared on a paper sheet in the apparatus can be automatically combined with another image to make a composite image.

BRIEF DESCRIPTION OF THE DRAWINGS

This and other objects and features of the present invention will become apparent from the following description taken in conjunction with the preferred embodiment thereof with reference to the accompanying drawings.

DESCRIPTION OF THE PREFERRED EMBODIMENT

A preferred embodiment of an image forming apparatus according to the present invention is described below in reference to the accompanying drawings.

Figure 1:
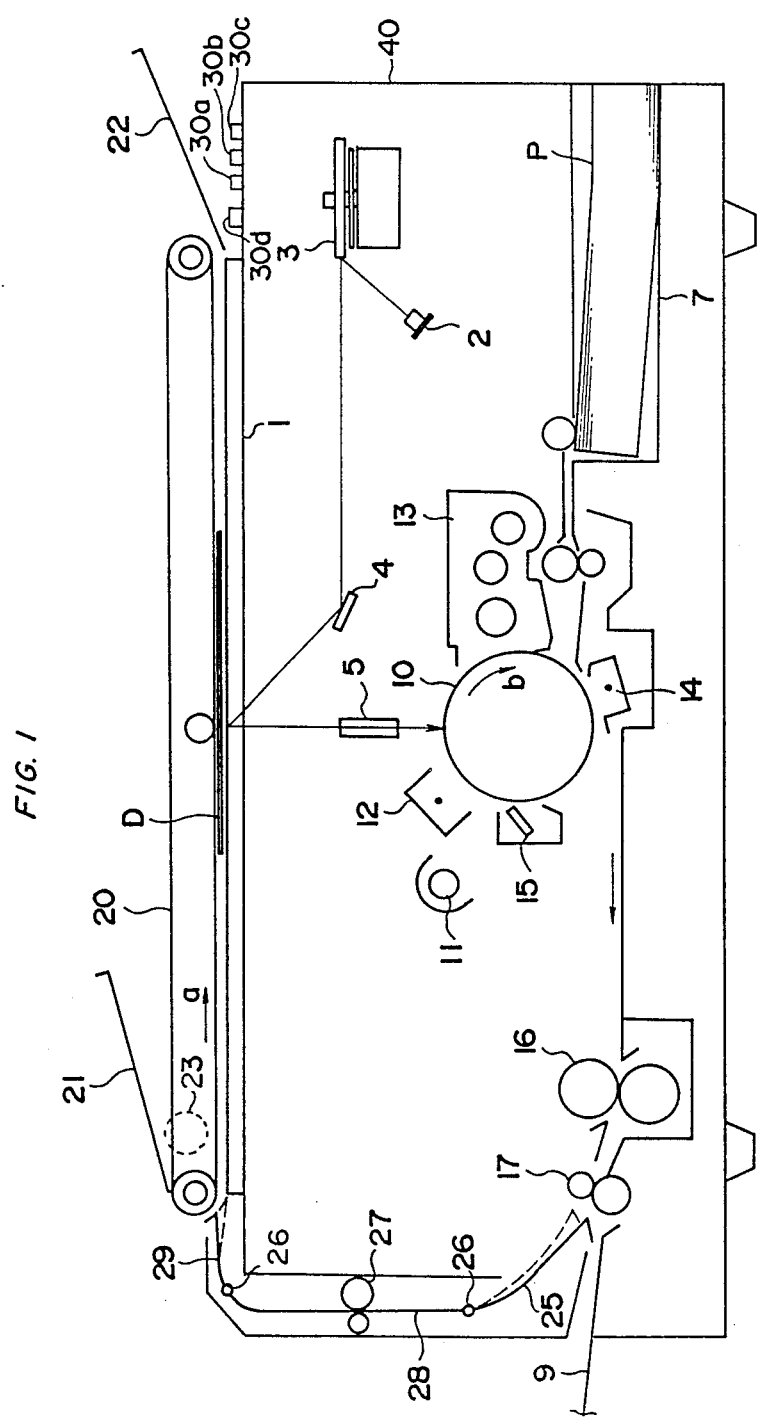
FIG. 1 is a schematic view showing a general constitution of an image forming apparatus according to the present invention.

Numeral 1 in FIG. 1 is an original glass which is provided on a body 40 of an apparatus. Numeral 2 is a laser diode. Numeral 3 is a polygon mirror enabling a laser beam to scan. Numeral 4 is a mirror. Numeral 5 is a lens array equipped with an optical fiber. A laser beam emitted from the laser diode 2 irradiates each surface of the polygon mirror 3, and the reflected light irradiates the mirror 4, thereby being directed to an original D which is conveyed by a conveyer belt 20 on the original glass 1 in the direction of the arrow a or the white surface of the conveyer belt 20 to scan the surface. Then, the surface of a photosensitive drum 10 is exposed to the reflected light through the lens array 5. The laser diode 2 is controlled to be turned on and off by a drive circuit in accordance with an image signal produced from an image control device. The polygon mirror 3 is driven to rotate at a specified frequency. Such a control system of the image signal is so well-known that the detailed description is omitted.

The conveyer belt 20 is driven by a motor 23 to rotate on the original glass 1 in the direction of the arrow a. The conveyer belt 20 is also capable of being pulled up into an open position to uncover the original glass 1. Originals placed on an original tray 21 are fed out one by one by a feeder not shown in the drawings, and an original is moved on the original glass 1 in the direction of the arrow a to be exposed to the laser beam as described above. Then, the original is discharged onto a discharge tray 22.

The photosensitive drum 10 can be driven to rotate in the direction of the arrow b, and around the drum 10, an eraser lamp 11 for erasing residual charge, an electric charger 12, a developing device 13 taking a magnetic brush way, a transferring charger 14, a cleaning device 15 for removing residual toner with a blade, etc. are arranged. Copying paper P is fed sheet by sheet from a feeding cassette 7 which is removable and disposed at the lower part of the body 40 of the apparatus. When a sheet fed from the cassette 7 passes between the transfer charger 14 and the photosensitive drum 10, a toner image is transferred thereon. Thereafter, the sheet is transported to the left, and the toner image is fixed thereon by heat at a fixing device 16. Then, the sheet is discharged onto a tray 9 through a pair of discharge rollers 17.

Further, the apparatus of this embodiment comprises a unit for transporting copying paper transferred and fixed the image onto the original glass 1 in a case of operation in a recomposite copy mode that sheets on which images have been formed are used as originals. The transporting unit includes diverting plates 25, 29, a pair of transporting rollers 27 and a guide plate 28. The diverting plate 25 is pivoted on a shaft 26, and it is usually set at the position shown by the dashed line in FIG. 1 to guide copying paper passing through the pair of discharge rollers 17 to the tray 9. When the recomposite copy mode is selected, the diverting plate 25 is positioned as shown by the solid line to guide copying paper to the pair of transporting rollers 27. The other diverting plate 29 is pivoted on a shaft 26, and it is usually set at the position shown by the dashed line in FIG. 1 to guide originals fed out from the original tray 21 onto the original glass 1. When the recomposite copy mode is selected, the diverting plate 29 is positioned as shown by the solid line to guide copying paper fed by the pair of transporting rollers 27 onto the original glass 1. Copying paper fed onto the original glass 1 by the diverting plate 29, the same as ordinary originals, is moved on the original glass 1 in the direction of the arrow a by the rotation of the conveyer belt 20 and exposed to the laser beam. Thereafter, the copying paper is discharged onto the discharge tray 22.

A copy mode selection switch 30b, a print mode selection switch 30a, a composite mode selection switch 30c and a sheet path change-over switch 30d are arranged on the body 40 (refer to FIG. 1), and each mode is selected when a corresponding switch is turned on.

The recomposite mode is selected when the composite mode selection switch 30c and the sheet path change over switch 30d are depressed. Signals produced from these switches are input into the mechanical control unit 51 so that the mechanism control section 51 can perform necessary control.

The process of forming an image on a sheet of copying paper in the above-described constitution is hereinafter described.

Figure 2:
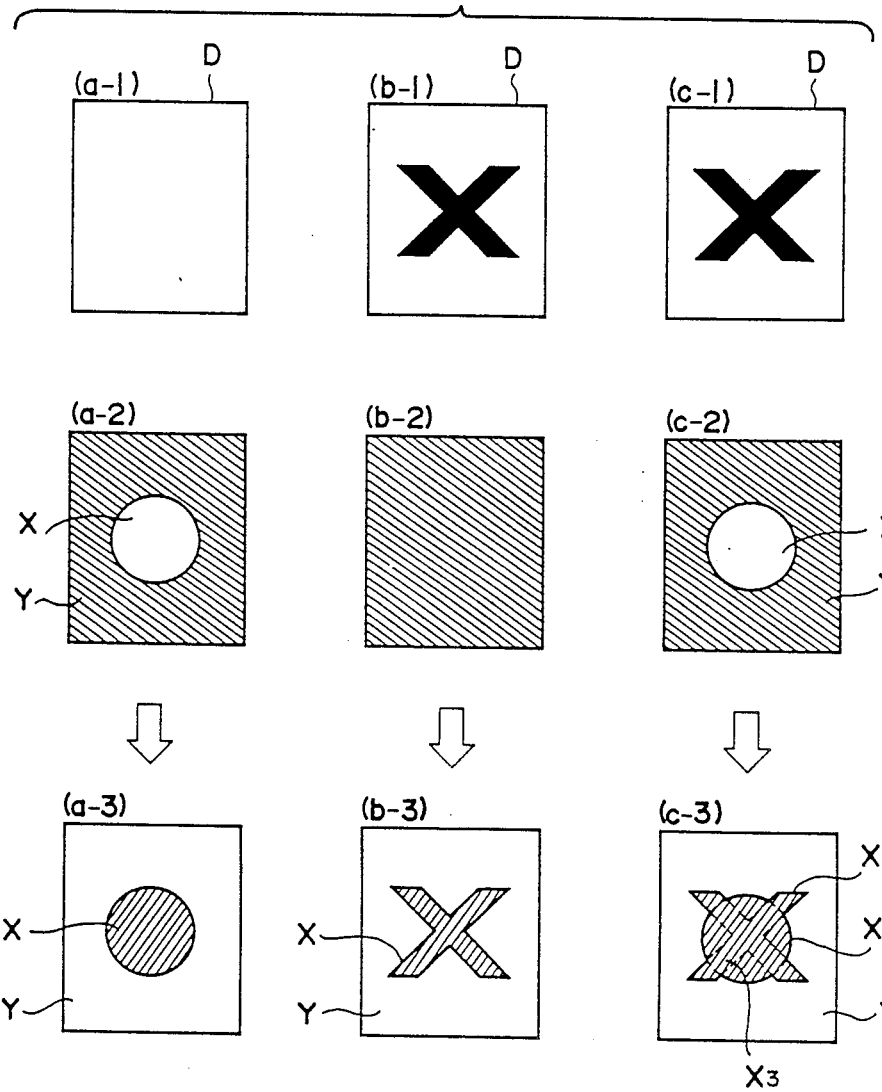
FIG. 2 is a view explaining the relations among the surface of an original, an output from a laser diode and a latent image.

First, in a case of printing an image with the modulated laser beam, as shown by FIG. 2, (a-1), a white blank sheet D should be placed on the original glass 1 as a reflecting surface, or the surface of the transport belt 20 should be used as a reflecting surface, and then image data is output from the laser diode 2 in response to the depression of the print mode selection switch 30a. For example, referring to FIG. 2, (a-2), the laser diode 2 is kept off while an imaged portion X in the shape of a circle is scanned, and the laser diode 2 is kept on while a background Y shown by oblique lines in the drawing is scanned. Thereby, as shown by FIG. 2, (a-3), an electrostatic latent image is formed on the photosensitive drum 10 of the imaged portion X maintaining electric charge and the background Y where electric charge was erased.

Also, in order to print out a copy of an original, the original should be moved on the original glass 1 by the rotation of the conveyer belt 20 in response to the depression of the copy mode selection switch 30b, and the laser diode 2 should be kept on all the time. For example, when the laser diode 2 keeps on emitting the laser beam [FIG. 2, (b-2)] to an original D as shown by FIG. 2, (b 1), an electrostatic latent image is formed on the photosensitive drum 10 of an imaged portion maintaining electric charge and a background Y where electric charge was erased, as shown by FIG. 2, (b-3).

Further, in a case of printing out a composite image of a copy of an original and an image resulting from turning on and off the laser beam, the original should be moved on the original glass 1 by the rotation of the conveyer belt 20, and at the same time the laser diode 2 should be turned on and off to output image data in response to the depression of the composite mode selection switch 30c. For example, the laser diode 2 radiates the laser beam to an original D as shown by FIG. 2, (c-1), being off while an imaged portion X in the shape of a circle shown by FIG. 2, (c-2) is scanned and being on while a background Y as shown by oblique lines in the drawing is scanned. Thereby, a composite electrostatic latent image is formed of two images as shown by FIG. 2, (c-3). In this case, the portion shown by X1, which was exposed to the laser beam, remains charged because it corresponds to an imaged portion of the original D. The portion shown by X2, which corresponds to a background of the original D, remains charged because it was not exposed to the laser beam. The portion shown by X3 remains charged because it corresponds to an imaged portion of the original D and was not exposed to the laser beam. In the other portion Y, the charge is erased, and the portion Y becomes a background.

When a sheet onto which an image formed on the photosensitive drum 10 through one of the processes above has been transferred and fixed is used for the composite image forming, as mentioned above, the diverting plates 25 and 29 are set at the positions shown by the solid lines to transport the sheet onto the original glass 1 in response to the depression of the sheet path change-over switch 30d.

Further, the diameter of the laser beam which irradiates the surface of an original needs to be sufficiently narrow in order to reproduce the image of an original well. Unless the diameter of the laser beam is sufficiently narrow, the laser beam will be apt to irradiate both white and black portions of an original at the same time, and the scattering coefficient of the reflection on the surface of the original will be large, resulting in poor image reproduction.

Figure 3:
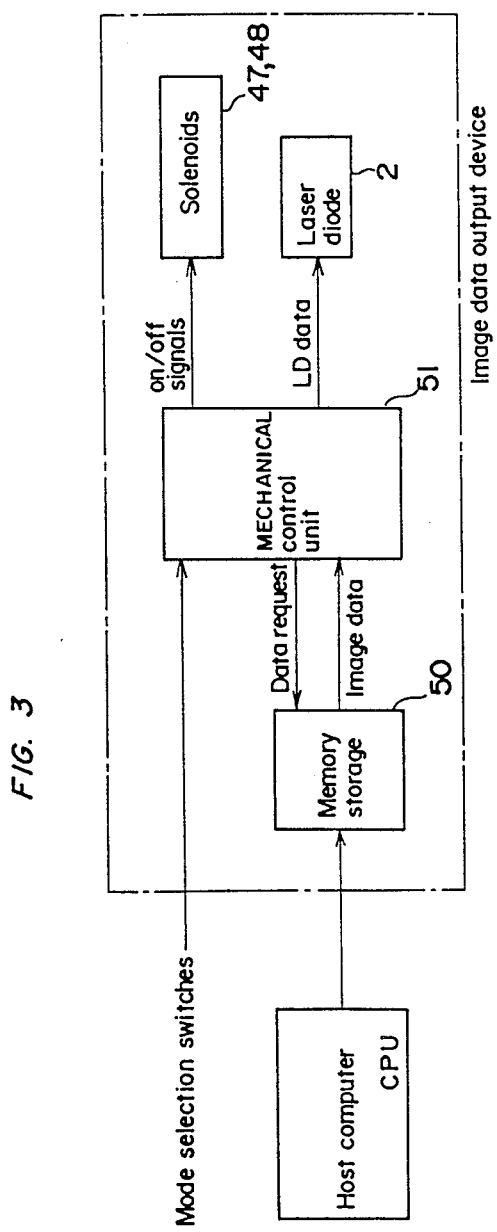
FIG. 3 is a block diagram showing a control circuitry.

The apparatus is controlled by an image data output device (refer to FIG. 3). A memory storage 50 outputs image data in response to a data requiring signal from a mechanical control unit 51, and the laser diode 2 is controlled in accordance with the image data. The mechanical control unit 51 also turns on and off solenoids 47 and 48 which move the diverting plates 25 and 29.

On the other hand, in this embodiment, the original conveyer belt 20 which conveys originals from the tray 21 to the tray 22 is used, but a circular system that originals are returned to the original tray 21 after exposure and fed to the original glass 1 again can be adopted, too. Also, regarding a means of transporting copying paper onto the original glass 1, it is possible that the copying paper is once stored in an intermediate tray and then fed onto the original glass 1.

Although in this embodiment, the recomposite copy mode is selected by depressing the composite mode selection switch 30c and the sheet path change-over switch 30d, it is possible to provide a recomposite copy mode selection switch for executing operation in the recomposite copy mode instead of the sheet path change-over switch 30d.

Further, in this embodiment, as a means of scanning the image of an original, the moving original type has been adopted, but a moving original glass type and an optical system can be so made to be movable instead. Furthermore, as a photosensitive member, not only one on which an electrostatic latent image is formed but also a silver salt film can be used.

Although the present invention has been described in connection with the preferred embodiment thereof, it is to be noted that various changes and modifications are apparent to those who are skilled in the art. Such changes and modifications are to be understood as included within the scope of the present invention as defined by the appended claims, unless they depart therefrom.

What is claimed is:

1. An image forming apparatus, comprising:
   an original glass for supporting an original;
   a rotatable photosensitive member;
   laser beam radiating means;
   optical means for guiding the laser beam radiated from said laser beam radiating means to said original glass and for projecting an image reflected from an original onto said photosensitive member;
   scanning means for scanning the reflected image from the surface of an original relatively to said optical means;
   control means for turning on and off said laser radiating means to radiate a laser beam in accordance with image data;
   means for making a latent image formed on said photosensitive member visible on a paper sheet; and
   means for transporting said paper sheet with a visible image onto said original glass.

2. An image forming apparatus as claimed in claim 1, wherein said scanning means is means for conveying an original on said original glass, said conveying means being capable of rotating and located on said original glass.

3. An image forming apparatus as claimed in claim 1, wherein said laser beam radiating means comprises a radiant element for radiating a laser beam and a scanning device for scanning the laser beam radiated from said radiant element in the direction perpendicular to the scanning direction by said scanning means.

4. An image forming apparatus as claimed in claim 1, wherein said optical means includes a lens array equipped with optical fiber, said lens array being arranged under said original glass.

5. An image forming apparatus as claimed in claim 4, wherein said optical means further includes a mirror near said lens array, and said mirror reflects the laser beam radiated from said laser beam radiating means so that the reflected light irradiates said original glass.

6. An image forming apparatus, comprising:
   an original glass for supporting an original;
   a rotatable photosensitive member;
   laser beam radiating means for irradiating said original glass, said laser beam radiating means including a radiant element for radiating a laser beam and a scanning device for scanning the laser beam in a first direction;
   control means for turning on and off said radiant element to radiate the laser beam in accordance with image data;
   means for conveying the original on said original glass in a second direction perpendicular to the first direction;
   optical means for projecting an image reflected from the original onto said photosensitive member;
   means for developing an electrostatic latent image formed on said photosensitive member into a visible image and for transferring said visible image onto a sheet; and
   means for transporting said sheet with the visible image onto said original glass so as to be used as an original.

7. An image forming apparatus as claimed in claim 6, further comprising:
   a tray for receiving the sheet on which the visible image has been transferred;
   a first path through which the sheet is transported onto said tray;
   a second path through which the sheet is transported onto said original glass by said transporting means; and
   select means for selecting either said first path or said second path.

* * * * *

UNITED STATES PATENT AND TRADEMARK OFFICE
CERTIFICATE OF CORRECTION

PATENT NO. : 4,965,870

DATED : October 23, 1990

INVENTOR(S) : Hirofumi Hasegawa, et al

It is certified that error appears in the above-identified patent and that said Letters Patent is hereby corrected as shown below:

On the title page, Item [30] Foreign Application Priority Data:
delete "63-162212" and insert
--63-162213--.

Signed and Sealed this

Tenth Day of August, 1993

*Attest:*

MICHAEL K. KIRK

*Attesting Officer*     Acting Commissioner of Patents and Trademarks